Dec. 30, 1930.    C. F. CLARK ET AL    1,787,143
SNAP FASTENER
Filed July 1, 1927
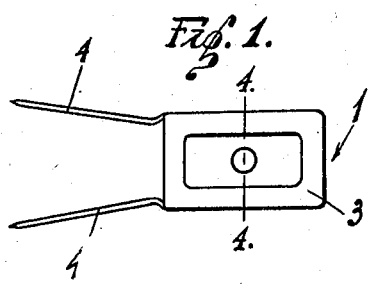
Fig. 1.
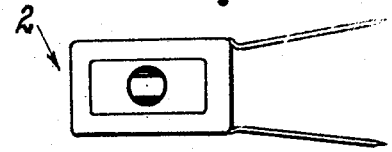
Fig. 5.
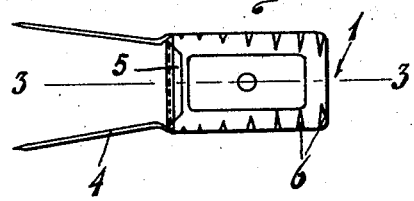
Fig. 2.
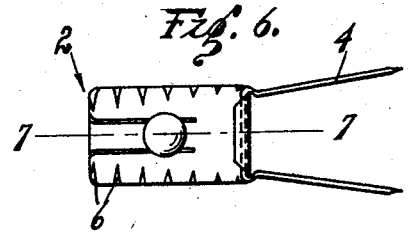
Fig. 6.
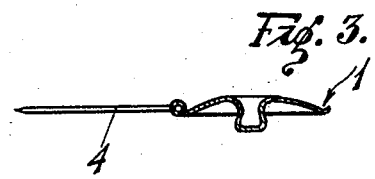
Fig. 3.
Fig. 7.
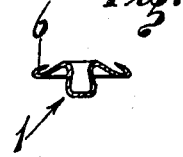
Fig. 4.
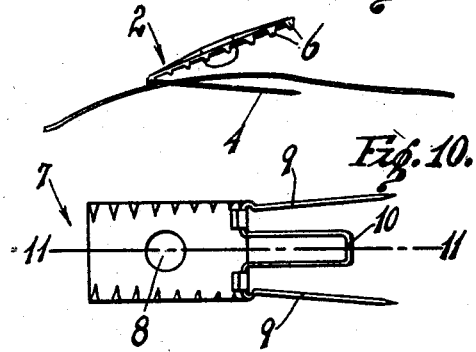
Fig. 8.
Fig. 10.
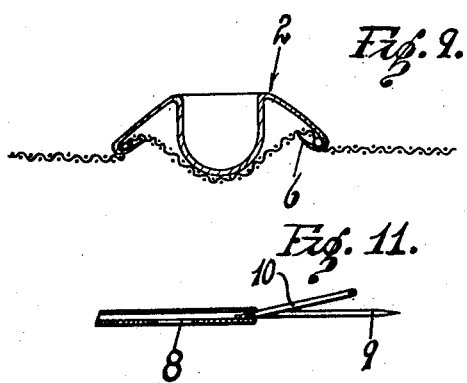
Fig. 9.
Fig. 11.
INVENTORS.
CECIL F. CLARK.
MABEL V. CLARK.
BY
ATTORNEY Patented Dec. 30, 1930

1,787,143

UNITED STATES PATENT OFFICE

CECIL F. CLARK AND MABEL V. CLARK, OF LOS ANGELES, CALIFORNIA

SNAP FASTENER

Application filed July 1, 1927. Serial No. 202,808.

Our invention relates to means for attaching snap fasteners and the like to garments, and the prime object is to provide a simple and effective means for securing the fastener to the garment without sewing the same thereto.

Another object is to provide a fastener which may be quickly and easily attached or detached to a garment.

Still another object is to provide a snap fastener which is simple in construction, inexpensive to manufacture, and effective in use.

Other objects, advantages, and features of invention may appear from the accompanying drawing, the subjoined detailed description, or the appended claims.

In the drawing:

Fig. 1 is a plan view of the stud member.

Fig. 2 is a bottom plan of the same.

Fig. 3 is a sectional view taken on line 3, 3, Fig. 2.

Fig. 4 is a sectional view taken on line 4, 4, Fig. 1.

Fig. 5 is a plan view of the socket member.

Fig. 6 is a bottom plan view of the same.

Fig. 7 is a sectional view taken on line 7, 7, Fig. 6.

Fig. 8 is a side elevation of our fastener about to be secured to a piece of cloth.

Fig. 9 is an enlarged transverse sectional view of our fastener mounted on a piece of cloth.

Fig. 10 is a bottom plan view of a modified form of a fastener.

Fig. 11 is a sectional view taken on line 11, Fig. 10.

Referring more particularly to the drawing:

Our snap fastener comprises a stud member 1 and a socket member 2 which co-act each with the other to secure two pieces of cloth, or sections of a garment together, all of which is usual and well-known in the art.

The novel feature of our invention resides mainly in the means of securing the stud and socket to the cloth, and this means is identical for both members and, therefore, only one will be specifically described. While we have shown our stud and socket members rectangular in shape, it is to be understood that other shapes may be employed without departing from the spirit of our invention.

The stud and socket members comprise a plate 3 and the stud member is convex in form, while the socket member is concave, as shown in Figs. 3 and 7; or this curvature may be vice versa, if desired. The object of this construction is to make a closer fit of the two members. To each of the members 1, 2 and at one side thereof, we hinge a pair of pins 4, 4, which pins may or may not be pointed, as desired. The pins 4 may be hinged to the plate 3 in a number of different ways and we here show a flap 5 integral with the plate and rolled over the portion of the pins which extends across the plate. That is, we prefer that the pins 4, 4 be formed of a single strip of resilient wire bent in a U-shape, although it is possible that the pins may be made separately.

Along the edges of the lower face of the plate 3 we provide a plurality of inwardly extending pointed teeth 6 under which the pins 4 are adapted to rest when in closed position. The teeth 6 are preferably graduated in size, increasing in length towards the end opposite to the pivot of the pins 4.

In securing our fastener to a piece of cloth the pins 4, 4 are forced through the cloth but do not again extend through the cloth in the manner in which a pin is fastened. That is, the pins remain under the cloth and only pierce the same once. After the pins are passed through the cloth the plate 3 is folded over upon them and the pins 4 are then sprung under the teeth 6. We prefer that the pins 4, 4 taper outwardly so that they will be held under the teeth with a spring tension.

It is obvious that if desired the teeth 6 may extend outwardly, in which event the pins 4 when sprung under said teeth are urged inwardly, due to the taper thereof. In the modified form of our invention, shown in Figs. 10, 11, the socket member 7 is provided with a central hole 8 extending therethrough. The pivoted pins 9, 9 are provided with a central U-shaped clamping member 10 which extends over the hole 8 when the pins 9 are in locked position. Thus when the stud is forced through the hole 8 it will be gripped by the member 10, thus holding the member securely in position. The member 10 is preferably bent above the plane of the pins 9, as shown in Fig. 11, in order that it may be firmly held over the hole 8 when the pins 9 are in locked position.

While we have shown the member 10 as integral with the pins 9, it is evident that it may be a separate hinged member, if desired. The member 10 is held against the body of the socket member 7 with a spring tension so that it will not be pushed outwardly when the stud is entered through the hole 7.

Having described our invention, we claim:

1. In a snap fastener including a plate, a pair of pins pivotally connected to one end of said plate, teeth on said plate against which said pins are adapted to rest to grip the cloth.

2. In a snap fastener including a plate, a pair of outwardly extending pins pivotally connected to said plate, a plurality of pointed teeth on the sides of said plate against which said pins are adapted to rest to grip the cloth.

3. In a snap fastener including a plate, a pair of outwardly extending pins pivotally connected to said plate, a plurality of pointed teeth on said plate under which said pins are adapted to rest to grip the cloth, said teeth being graduated in size and being greater in length at the opposite end of the plate to which the pins are pivoted.

4. In a snap fastener including a rectangular curved plate, a pair of pins pivotally mounted on one end of said plate, a plurality of graduated teeth along the sides of said plate under which the pins are adapted to be sprung to grip the cloth.

5. In a snap fastener including a rectangular curved plate, a pair of pins pivotally mounted on one end of said plate, a plurality of graduated teeth along the sides of said plate under which the pins are adapted to be sprung to grip the cloth, said pins being pivoted to the plate by a flap integrally formed with said plate and bent under said pins.

6. In a snap fastener including a plate having an opening therein, a pair of pins pivotally connected to said plate at one end thereof, a plurality of teeth on the sides of said plate under which said pins rest to grip the cloth when the fastener is closed, and gripping means on the pins extending across said opening when the pins are in position under said teeth.

7. In a snap fastener including a plate, a pair of pins movably mounted on one end of said plate, teeth on the sides of said plate, said teeth gripping the cloth to prevent the sliding of said fastener on the cloth, when the fastener is in use with said pins extending through the cloth.

In testimony whereof, we affix our signatures.

CECIL F. CLARK.
MABEL V. CLARK.